United States Patent
Choi et al.

(10) Patent No.: US 12,332,345 B2
(45) Date of Patent: Jun. 17, 2025

(54) RADAR DEVICE FOR VEHICLE AND CONTROLLING METHOD THEREOF

(71) Applicant: HL KLEMOVE CORP., Icheon (KR)

(72) Inventors: Jung Hwan Choi, Seoul (KR); JinGu Lee, Ansan-si (KR); Han Byul Lee, Seoul (KR); Jae Hyun Han, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 387 days.

(21) Appl. No.: 17/675,309

(22) Filed: Feb. 18, 2022

(65) Prior Publication Data

US 2022/0268924 A1     Aug. 25, 2022

(30) Foreign Application Priority Data

Feb. 19, 2021     (KR) .................. 10-2021-0022244

(51) Int. Cl.
| | | |
|---|---|---|
| G01S 13/931 | (2020.01) | |
| G01S 13/53 | (2006.01) | |
| H01Q 1/32 | (2006.01) | |
| G01S 7/285 | (2006.01) | |
| G01S 7/40 | (2006.01) | |

(Continued)

(52) U.S. Cl.
CPC .......... G01S 13/931 (2013.01); G01S 13/53 (2013.01); H01Q 1/3233 (2013.01); G01S 7/285 (2013.01); G01S 7/4021 (2013.01); G01S 13/343 (2013.01); G01S 13/76 (2013.01)

(58) Field of Classification Search
CPC ...... G01S 13/931; G01S 13/53; G01S 13/343; G01S 13/42; G01S 7/4021; G01S 7/285; G01S 13/76; H01Q 1/3233
See application file for complete search history.

(56) References Cited

U.S. PATENT DOCUMENTS

| | | | |
|---|---|---|---|
| 2005/0156780 A1* | 7/2005 | Bonthron | .................. G01S 3/48 342/134 |
| 2017/0307745 A1* | 10/2017 | Matsui | ................ G01S 13/4454 |

(Continued)

FOREIGN PATENT DOCUMENTS

| | | |
|---|---|---|
| CN | 105589067 A | 5/2016 |
| CN | 110161504 A | 8/2019 |
| KR | 10-2020-0130997 A | 11/2020 |

OTHER PUBLICATIONS

Office Action dated Oct. 29, 2024 for corresponding Korean Patent Application No. 10-2021-0022244, along with an English machine translation (18 pages).

(Continued)

*Primary Examiner* — Timothy A Brainard
*Assistant Examiner* — Ismaaeel A. Siddiquee
(74) *Attorney, Agent, or Firm* — Hauptman Ham, LLP

(57) ABSTRACT

The embodiments of the present disclosure relate to a radar device including an antenna unit including a transmission antenna for transmitting a transmission signal and a receiving antenna for receiving a reception signal reflected from a target, a signal processor configured to determine target direction information by using a phase difference between the reception signals received from the respective receiving antennas, and a controller configured to control to perform a first mode and a second mode for transmitting and receiving signals at different pulse repetition intervals, respectively.

15 Claims, 13 Drawing Sheets

(51) Int. Cl.
    *G01S 13/34*           (2006.01)
    *G01S 13/76*           (2006.01)

(56) References Cited

U.S. PATENT DOCUMENTS

| | | | |
|---|---|---|---|
| 2018/0224528 A1* | 8/2018 | Rieger | G01S 17/42 |
| 2018/0259632 A1* | 9/2018 | Kishigami | G01S 7/2921 |
| 2019/0353780 A1* | 11/2019 | Statnikov | G01S 13/931 |
| 2020/0025906 A1 | 1/2020 | Kesaraju et al. | |
| 2021/0364616 A1* | 11/2021 | Wang | G01S 13/584 |
| 2022/0196795 A1* | 6/2022 | Wu | G01S 7/354 |

OTHER PUBLICATIONS

Office Action dated Aug. 28, 2024 for corresponding Chinese Patent Application No. 202210159033.5, along with an English machine translation (30 pages).

\* cited by examiner

RADAR DEVICE FOR VEHICLE AND CONTROLLING METHOD THEREOF

CROSS REFERENCE TO RELATED APPLICATION

This application claims priority from Korean Patent Application No. 10-2021-0022244, filed on Feb. 19, 2021, which is hereby incorporated by reference for all purposes as if fully set forth herein.

TECHNICAL FIELD

An embodiment of the present disclosure relates to a radar device for a vehicle and a controlling method thereof, more specifically, relates to a vehicle radar device for determining a direction of a target by using a phase difference between received signals, and a method for controlling the same.

BACKGROUND

A radar refers to a device that observes a target using radio waves. The radar may transmit a signal from a transmission antenna, and receive and analyze a signal reflected by a target at a receiving antenna to detect the direction and distance of the target and speed, etc.

In particular, in the case of radar for vehicles, there is required to optimize performance while using a miniaturized device unlike in the military or meteorological field. In this regard, recently, a radar device equipped with a multiple-input multiple-output (MIMO) antenna has been used.

Meanwhile, in the case that a signal is transmitted using two or more transmission antennas in such a radar device, there is a problem that the direction measurement accuracy of the target may be deteriorated depending on the time difference between the transmission antennas or the setting of a pulse repetition interval.

SUMMARY

Embodiments of the present disclosure provide a vehicle radar device capable of improving the direction measurement accuracy for a target, and method for controlling the same.

In addition, embodiments of the present disclosure provide a vehicle radar device capable of resolving a direction measurement error by correcting a phase measurement error of a reception signal and a control method therefor.

In an aspect of the present disclosure, the present embodiments may provide a radar device for a vehicle including an antenna unit including a transmission antenna for transmitting a transmission signal and a receiving antenna for receiving a reception signal reflected from a target, a signal processor configured to determine target direction information by using a phase difference between the reception signals received from the respective receiving antennas, and a controller configured to control to perform a first mode and a second mode for transmitting and receiving signals at different pulse repetition intervals, respectively, wherein the signal processor is configured to, if a preset phase correction condition is satisfied, correct a second mode reception signal received in the second mode based on a first mode reception signal received in the first mode.

In another aspect of the present disclosure, the present embodiments may provide a controlling method of a vehicle radar device including transmitting a transmission signal using a transmission antenna and receiving a reception signal reflected from a target using a receiving antenna, determining target direction information by using a phase difference between the reception signals received from the respective receiving antennas, and controlling to perform a first mode and a second mode for transmitting and receiving signals at different pulse repetition intervals, respectively, wherein determining target direction information comprises correcting, if a preset phase correction condition is satisfied, a second mode reception signal received in the second mode based on a first mode reception signal received in the first mode.

According to embodiments of the present disclosure, it is possible to provide a vehicle radar device capable of improving the direction measurement accuracy for a target, and method for controlling the same.

In addition, according to embodiments of the present disclosure it is possible to provide a vehicle radar device capable of resolving a direction measurement error by correcting a phase measurement error of a reception signal and a control method therefor.

DETAILED DESCRIPTION

Figure 1:
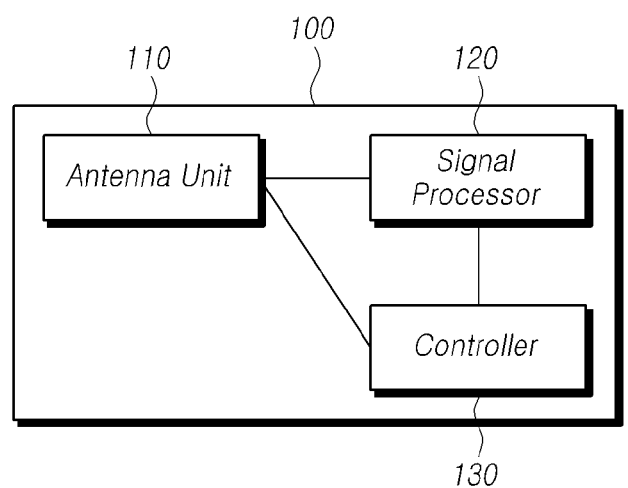
FIG. 1 is a block diagram of a vehicle radar device according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

In the present disclosure, a first mode is defined as having the same meaning as a pre-acquisition mode, a pre-mode, or a correction mode. In addition, a second mode is defined as having the same meaning as a normal mode or a general mode.

FIG. 1 is a block diagram of a vehicle radar device according to the present disclosure.

Referring to FIG. 1, a vehicle radar device 100 according to the present disclosure may include an antenna unit 110, a signal processor 120, and a controller 130. In addition, the antenna unit 110, the signal processor 120 and the controller 130 may be connected to each other.

As an example, the vehicle radar device 100 may include the antenna unit 110 including a transmission antenna for transmitting a transmission signal and a receiving antenna for receiving a reception signal reflected from a target, and at least one of the signal processor 120 for determining the direction of the target by using the phase difference between the reception signals received from each receiving antenna, and the controller 130 for controlling so that a first mode and a second mode for transmitting and receiving signals at different pulse repetition intervals are performed, respectively.

The antenna unit 110 may include at least two or more transmission antennas and receiving antennas, respectively. In addition, in some cases, all antennas included in the antenna unit 110 may be used, or only some antennas may be used.

In the antenna unit 110, there may be used a multi-input multi-output (MIMO) technology using two or more transmission and receiving antennas, respectively. In addition, in some cases, there may be used a single-input multi-output (SIMO) technology, a multi-input single-output (MISO) technology, or a single-input single-output (SISO) technology. That is, all of the antennas included in the antenna unit 110 may be set to be used, or only a part of each of the transmission antenna and the receiving antenna may be set to be used.

The transmission antennas may transmit signals by radiating electromagnetic signals. In this case, the transmission signal may be transmitted based on a preset value for the transmission direction and range of the signal, transmission time, signal strength, and the like. In addition, the waveform of the transmission signal may be implemented as one or more of various well-known waveforms, such as a pulse waveform and a chirp waveform.

The receiving antenna may receive a signal incident from the outside. Here, the reception signal may include a signal in which the transmitted signal transmitted from the transmission antenna is reflected by the target. In addition, the reception signal may contain information about a strength and amplitude, frequency of the signal, angle of arrival, distance from the target, and a speed of the target.

In addition, the transmission signal and the reception signal may be implemented to use a transmission channel and a receiving channel, respectively, or may be implemented to use a synthesized channel. Here, the synthesized channel may be implemented to express changes in magnitude and phase of the reception signal with respect to the transmission signal and reflection signal thereof. In addition, the transmission signal and the reception signal may be synthesized and processed, and the synthesized signal may include an intermediate frequency (IF) signal.

For example, in a configuration including two transmission antennas of a first transmission antenna Tx1 and a second transmission antenna Tx2, and four receiving antennas of a first receiving antenna Rx1, a second receiving antenna Rx2, a third receiving antenna Rx3 and a fourth receiving antenna Rx4, if a signal is transmitted from Tx1 and a reflected signal is received from Rx4, the signal may be processed in a synthesized channel of Tx1-Rx4.

Meanwhile, the signal transmitted and received by the antenna unit 110 may be controlled by the controller 130. In this case, the signal transmission/reception control may be performed based on preset setting values required for signal transmission/reception, such as the number of each used transmission antenna and receiving antenna, and a pulse repetition interval.

In this case, two or more modes having different setting values may be set based on the control setting values, respectively, and transmission and reception of signals in each mode may be controlled based on the control setting values for each mode.

For example, the signal transmission/reception may be controlled based on a control setting value set to, in the first mode, transmit a signal at a first pulse repetition interval using the first transmitting antenna, and in the second mode, transmit a signal at a second pulse repetition interval using the first transmission antenna and the second transmission antenna.

It will be described a specific details regarding the signal control in the antenna unit 110 in more detail in the controller 130 below.

The signal processor 120 may determine phase information regarding the phase of each signal, target direction information regarding the direction of the target located from the radar, and the like based on the signals transmitted and received by each antenna. Here, the signal processor 120 may process signals transmitted and received in different modes, respectively, or may process signals transmitted and received in different modes together.

For example, if signals are transmitted and received in each of the first mode and the second mode, the signal processor 120 may determine phase difference information and target direction information using only a first mode reception signal or only a second mode reception signal. Alternatively, the signal processor 120 may determine the phase difference information and target direction information by using information of the first mode reception signal and the second mode reception signal together.

In addition, the signal processor 120 may determine phase difference information between reception signals received from each receiving antenna, and may determine target direction information using the phase difference information.

The phase difference information may be determined by comparing the phase information of each reception signal, or may be determined by using information included in two or more reception signals received from at least two receiving antennas.

Specifically, the information included in the reception signal may includes at least one of a chirp time Tc, a wavelength λ and a frequency f of the reception signal, a distance d and a speed v of a target, or a Doppler frequency fd of the reception signal. Here, the speed of the target may include a relative speed of the target with respect to the vehicle radar device 100.

For example, the phase difference information may be calculated based on at least one of the following equations, and any known technology capable of calculating the phase difference may be used in addition to the following equation.

Phase difference between reception signals
ΔΦ=phase difference constant×Doppler frequency of target×chirp time=phase constant×
speed of target×chirp time×frequency of reception signal=phase constant×speed of target×
chirp time÷wavelength of reception
signal=phase constant×distance of
target÷wavelength of reception signal [Equation]

Here, the phase constant refers to a constant required in common to calculate the phase difference. Such a phase constant may have a value such as 2π or 4π depending on the specification or target detection situation of the vehicle radar device 100 according to the present disclosure, and may be set differently if the specification or target detection situation changes.

The target direction information may be calculated based on the angle of arrival information of the reception signal which is reflected back at the target. In addition, the angle of arrival information may be calculated based on at least one of the following equations, and any known technique capable of calculating the angle of arrival of the reception signal may be used in addition to the following equation.

Angle of Arrival (θ)=sin$^{-1}${(reception signal wavelength×phase difference between reception signals)/(2π×distance of target)}=sin$^{-1}$ {phase difference between reception signals/(2π×distance of target×reception signal frequency)}=sin$^{-1}${ (reception signal wavelength×phase difference between reception signals)/(2π×speed of target× chirp time)} [Equation]

Meanwhile, if it is determined that the preset phase correction condition is satisfied, the signal processor 120 may correct the phase of the reception signal. At least one of these phase correction conditions may be set, and if one of them is satisfied, the phase correction may be performed.

Such phase correction may be performed using at least one of a method of respectively correcting phase information of a reception signal and a method of correcting phase difference information between reception signals.

Specifically, if one or more of each phase correction condition is satisfied, there may correct the phase of the reception signal by adding π to the phase of the reception signal. In this case, the phase correction may be performed for all or part of the measured reception signal.

For example, if a reflected signal of a signal transmitted by the first transmission antenna is received in the first mode, and a reflected signal of a signal transmitted by the first transmission antenna and the second transmission antenna is received in the second mode, phase correction may be performed only for a reception signal obtained by receiving a reflected signal of a signal transmitted by the second transmitting antenna in the second mode.

As described above, since the target direction information may be determined based on the phase difference information between the reception signals, the target direction information can be corrected by correcting the phase of the reception signal. That is, the accuracy of target direction estimation may be improved through phase correction.

As an example, the phase correction condition may be set based on the phase difference information of the reception signal. As a specific example, the phase correction condition may be a condition in which it is determined that the phase difference information between the reception signal received by reflection of the transmission signal of the first transmission antenna and the reception signal received by reflection of the transmission signal of the second transmission antenna is π or more. In addition, if this phase correction condition is satisfied, phase correction may be performed.

As another example, the phase correction condition may be set based on Doppler frequency information and maximum Doppler frequency information of a reception signal. As a specific example, the phase correction condition may be set to perform the phase correction if the Doppler frequency information of the first mode reception signal exceeds the maximum Doppler frequency information of the second mode reception signal.

Here, the Doppler frequency refers to a change in the apparent frequency according to the Doppler effect. For example, in the vehicle radar device 100 according to the present disclosure, the Doppler frequency may be determined based on a frequency difference between a transmission signal transmitted from a transmission antenna and a reception signal reflected back by the target.

In addition, the maximum Doppler frequency refers to a maximum value that the Doppler frequency can have when the frequency of the transmission signal and the speed of the target have constant values. For example, if there is satisfied the condition in which the frequency of the transmission signal is maintained constant and the speed of the detected target is constant based on the control setting value preset with respect to the first mode, under normal circumstances, the Doppler frequency measured in the first mode cannot exceed the maximum Doppler frequency of the first mode.

That is, in the case that the signal transmission/reception is performed based on a preset control setting value, the maximum Doppler frequency may be determined in advance regardless of signal transmission/reception. In addition, if the measured Doppler frequency exceeds the maximum Doppler frequency, it is determined that a measurement error has occurred, and a phase correction condition may be set to perform phase correction in this case.

In addition, the determination of whether the phase correction condition is satisfied may be performed by comparing the setting value and the measured value of each mode in a state in which two or more modes having different control setting values are performed in the vehicle radar device 100 according to the present disclosure.

In general, the smaller the pulse repetition interval in radar, the larger the maximum detection speed but the smaller the maximum detection range.

For example, in the case that the first mode transmits a signal at a first pulse repetition interval and the second mode transmits a signal at a second pulse repetition interval, the maximum detection speed and maximum detection range may be different according to the difference in pulse repetition interval in each mode.

That is, if the first pulse repetition interval is smaller than the second pulse repetition interval, the maximum detection speed of the first mode may be smaller than the maximum detection speed of the second mode, and the maximum detection range of the first mode may be greater than the maximum detection range of the second mode. In addition, it is possible to perform correction of the reception by using this characteristic.

As an example, if the speed of the target is smaller than the maximum detection speed of the first mode but exceeds the maximum detection speed of the second mode, there may occur a target measurement error in the second mode. A case in which an object exceeding the maximum detection speed is detected at a speed different from the actual speed may be referred as a velocity folding or a velocity aliasing.

In this case, the detection signal of the second mode may be corrected using the detection signal of the first mode. That is, the second mode reception signal may be corrected by using at least one of speed information, distance information, Doppler frequency information, and phase difference information of the target in the first mode reception signal.

As another example, if the distance of the target is smaller than the maximum detection range of the second mode but exceeds the maximum detection range of the first mode, this may cause a target measurement error in the first mode.

In this case, the detection signal of the first mode may be corrected using the detection signal of the second mode. That is, the first mode reception signal may be corrected by using at least one of speed information, distance information, Doppler frequency information, and phase difference information of the target in the second mode reception signal.

It will be described the correction of the reception signal below with more specific examples with reference to FIGS. 7 to 10.

The controller 130 may control the transmission and reception of a signal based on a preset control setting value. Here, the control setting value may include at least one of a transmission/receiving antenna specification, a transmission time, a frequency, a radiation direction, and an intensity of the signal. Here, the transmission time of the signal may be set as a pulse repetition interval (PRI).

In addition, the controller 130 may set different control setting values for at least two or more modes, so that signal transmission and reception can be performed based on different control setting values for each mode. In addition, according to the control setting value for each mode, it is possible to control to vary a part or all of the detection performance of the vehicle radar device 100 according to the present disclosure.

For example, the controller may set the control setting value so that a signal is transmitted at a first pulse repetition interval using the first transmission antenna in the first mode, and a signal is transmitted at a second pulse repetition interval using the first transmission antenna and the second transmission antenna in the second mode.

In this case, if the first mode using one transmission antenna and the second mode using two transmission antennas are compared, the resolution of the second mode may be evaluated as having better performance than that of the first mode.

As an example, the controller 130 may set the control setting values of the first mode and the second mode so that the first pulse repetition interval is smaller than the second pulse repetition interval. In this case, the maximum detection speed of the first mode is greater than the maximum detection speed of the second mode, and the maximum detection range of the first mode is smaller than the maximum detection range of the second mode, so that the target detection performance of each mode may be different.

Meanwhile, the controller 130 may control the first mode and the second mode to be performed in units of time or frames, and may control the first mode and the second mode by presetting execution times, execution orders, and the like.

For example, the controller 130 may control the first mode and the second mode to be performed within one frame. That is, if the vehicle radar device 100 according to the present disclosure performs one scan, it is possible to control the first mode and the second mode to be performed in the scanning range.

As described above, if the first mode and the second mode are controlled to be performed within one frame range, they do not become larger than a certain size at the measurement time point. Therefore, in comparing and correcting the measurement results of each mode regarding the position and speed of the target with the measurement results of other modes according to the present disclosure, it is possible to improve the accuracy of target measurement.

In this case, the first mode and the second mode may be set to be performed simultaneously, or may be set to be performed separately from each other. Here, if the first mode and the second mode are performed separately from each other, there may utilize a time division multiplexing (TDM) scheme in which signals are transmitted and received at different times.

In addition, if the first mode and the second mode are controlled by the time division multiplexing method, there may be set such that the first mode is performed first and then the second mode is performed.

For example, if the pulse repetition interval of the first mode is set to be small, even if the target speed exceeds the maximum detection speed of the second mode, it is possible to correct the second mode reception signal using the result of the first mode performed first, thereby improving the accuracy in terms of speed and angle of target measurement.

As another example, if the pulse repetition interval of the first mode is set to be large, even if the target distance exceeds the maximum detection range of the second mode, it is possible to correct the second mode reception signal using the result of the first mode performed first, thereby improving the accuracy in terms of speed and angle of target measurement.

In addition, the controller 130 may control that both the first mode and the second mode are performed within one frame, and in this case, may control so that the first mode is performed first and then the second mode is performed. In addition, if the phase correction of the reception signal is performed by the signal processor 120, the signal transmission/reception and control of each mode may be performed by reflecting the correction contents thereafter.

Figure 2:
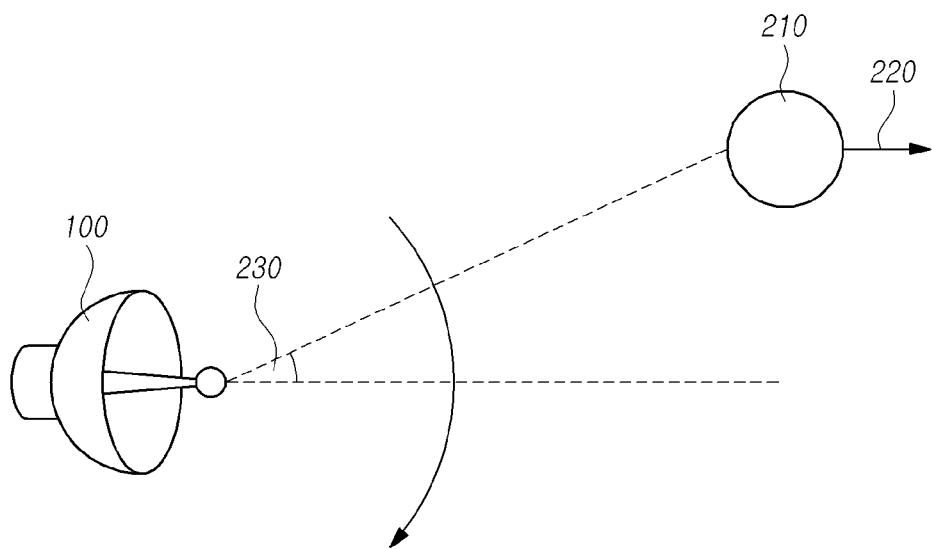
FIG. 2 illustrates an example of a configuration for detecting a target using a vehicle radar device according to an embodiment.

FIG. 2 illustrates an example of a configuration for detecting a target using a vehicle radar device according to an embodiment.

Referring to FIG. 2, the vehicle radar device 100 according to an embodiment may detect a target 210 using a transmitted/received signal. In this case, the target 210 is an object moving with a constant target speed 220, and may be detected as being located in a target direction 230.

The vehicle radar device 100 according to an embodiment may transmit a signal based on a preset pulse repetition interval, and may receive a signal returned by reflecting on a target. Then, the target may be detected by calculating the target speed 220 and the target direction 230 using information included in the transmission signal and the reception signal.

First, the vehicle radar device 100 according to an embodiment may calculate the phase difference ΔΦ between the reception signals within one chirp, and may calculate the target speed 220 and the target direction 230 based on the calculated phase difference information.

Here, the phase difference information may be determined using at least one of a value obtained by multiplying Doppler frequency information and a chirp time included in the reception signal, or a value obtained by dividing the distance of the target by the wavelength of the reception signal.

The target speed 220 may be determined using at least one of a value obtained by multiplying the previously calculated phase difference information by the wavelength of the reception signal and then dividing by the chirp time, a value obtained by dividing the phase difference information by the frequency and chirp time of the reception signal, a value obtained by multiplying the wavelength of the reception signal by the distance of the target, and a value obtained by multiplying the speed of light by the Doppler frequency of the target and dividing by the frequency of the reception signal. In addition, there may be used any known technique capable of obtaining the speed of a target based on a radar signal.

There may be used a method of determining the target direction 230 by estimating the arrival angle of the target. In this case, the target direction may be determined using a sine graph or an inverse function graph of a sine function. In the case of using the sine graph or the inverse function graph of the sine function, the target direction may be determined using at least one of previously calculated phase difference information, the wavelength and frequency of the reception signal, the speed and distance of the target, and the chirp time. In addition, there may be used any known technique capable of obtaining a direction of a target based on a radar signal.

Meanwhile, the phase difference information, the target speed 220, and the target direction 230 may be determined in at least two or more modes. Then, there may include a configuration for comparing and correcting the respective determination results.

It will be described a correction of such a determination result below with more specific examples with reference to FIGS. 7 to 10.

Figure 3:
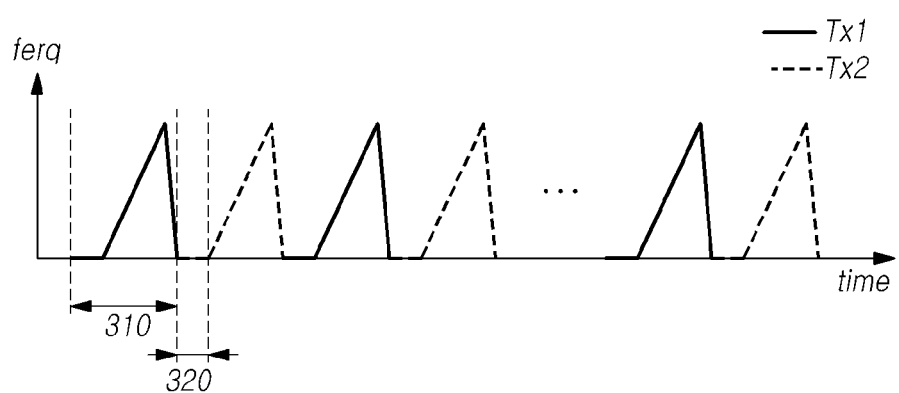
FIG. 3 is a graph for exemplarily explaining a configuration in which a transmission antenna is used in a time division manner in a vehicle radar device according to an embodiment.

FIG. 3 is a graph for exemplarily explaining a configuration in which a transmission antenna is used in a time division manner in a vehicle radar device according to an embodiment.

The vehicle radar device according to an embodiment may transmit a signal using two or more transmission antennas, and a transmission signal may be represented by a time-frequency graph. In addition, in some cases, in the case that the transmission signal corresponds to a chirp signal, it may be represented in the form of a chirp in the time-frequency graph.

In this case, each transmission antenna may be used to transmit a signal at different times in a time division multiplexing (TDM) manner, respectively, as shown in FIG. 3.

Referring to FIG. 3, the vehicle radar device according to an embodiment may transmit a signal in a time division multiplexing manner using two transmission antennas Tx1 and Tx2. In this case, in the time-frequency graph, a transmission signal may be represented by chirps alternately expressed, one for each transmission antenna.

For example, in the graph shown in FIG. 3, a solid line indicates a chirp generated by Tx1, and a dotted line indicates a chirp generated by Tx2. Here, a chirp time 310 means a time Tc corresponding to one chirp in each transmission antenna. In addition, the Tx1-Tx2 time difference 320 means a gap time Tg corresponding to an interval set in order to use Tx1 and Tx2 so that Tx1 and Tx2 do not overlap each other in time.

In this case, the chirp times of Tx1 and Tx2 may be set to the same time or set to different times. In addition, each chirp time and the Tx1-Tx2 time difference may be set to the same time or set to different times.

Figure 4:
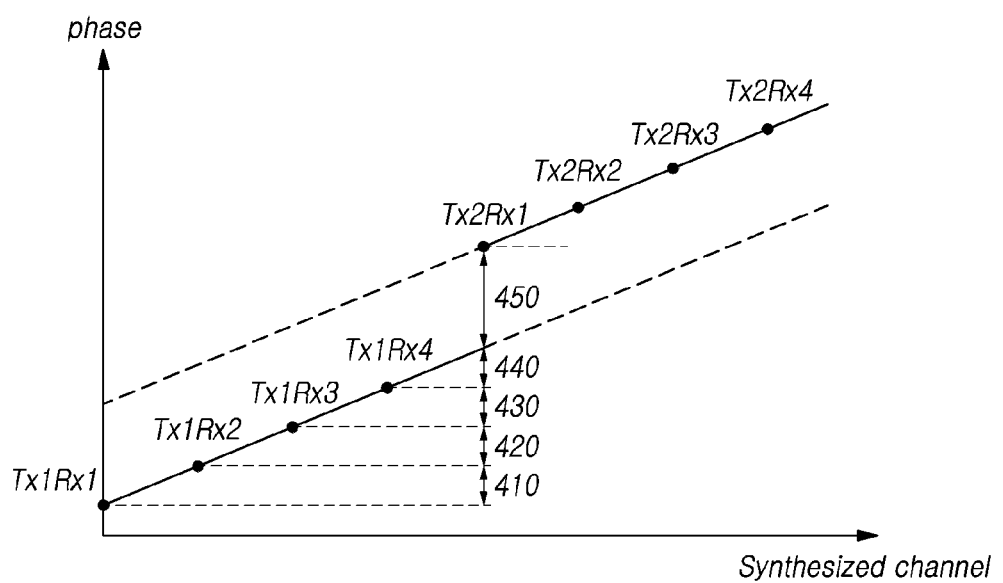
FIG. 4 is a graph for exemplarily explaining a phase difference generated in a reception signal according to an embodiment.

FIG. 4 is a graph for exemplarily explaining a phase difference generated in a reception signal according to an embodiment.

The vehicle radar device according to an embodiment may transmit and receive signals using two or more transmission antennas Tx1 and Tx2, and four receiving antennas Rx1, Rx2, Rx3 and Rx4. The signal transmitted and received in this way may be represented by a synthesized channel-frequency graph. In addition, in the case that such a signal corresponds to a chirp signal, it may appear in the form of a linear chirp in the synthesized channel-frequency graph.

Referring to FIG. 4, the vehicle radar device according to an embodiment may transmit and receive signals in a time division manner using two transmission antennas Tx1 and Tx2 and four receiving antennas Rx1, Rx2, Rx3, and Rx4.

In general, the resolution of radar can be improved as the number of antennas used increases. For example, in the case of a radar device that measures a target using a phase difference between receiving antennas, the resolution may be further improved when there are eight receiving antennas than when there are four receiving antennas. However, only a method of disposing more receiving antennas may have spatial and temporal limitations.

In this regard, in the case that two or more transmission antennas are used in a radar having the same number of receiving antennas, there may use a phase difference equal to the number of transmission antennas×the number of receiving antennas, so that the resolution can be further improved.

For example, a radar using one transmission antenna and four receiving antennas may use four phase differences of 1×4=4. In addition, a radar using one transmission antenna and eight receiving antennas may use eight phase differences of 1×8=8, and a radar using two transmission antennas and four receiving antennas may also use eight phase differences of 2×4=8.

As a result, a configuration using one transmission antenna and eight receiving antennas can use eight phase differences using 1+8=9 antennas, and a configuration using two transmission antennas and four receiving antennas can use eight phase differences using 2+4=6 antennas. As a result, since the latter configuration can be a radar system using the same number of phase differences using a smaller number of antennas, the efficiency of the antenna configuration can be increased accordingly.

However, in the case of a configuration using two or more transmission antennas, in calculating the phase difference between the receiving antennas, there may occur not only the time difference between the receiving antennas but also the time difference between the transmission antennas, thereby resulting in an unwanted phase jump For example, as shown in FIG. 3, in addition to the phase difference 410 between Rx1 and Rx2, the phase difference 420 between Rx2 and Rx3, the phase difference 430 between Rx3 and Rx4, and the phase difference 440 between Rx4 and Rx1, there may occur a phase difference 450 between Tx1-Rx4 and Tx2-Rx1, that is, a phase jump between Tx1 and Tx2.

Accordingly, compared to the configuration using one transmission antenna and eight transmission antennas, the configuration using two transmission antennas and four receiving antennas may cause an undesired phase jump although the number of phase differences between the receiving antennas is equal to 8, respectively. In addition, such a phase jump may cause unexpected errors in the measurement of the direction, distance, and speed of the target.

In addition, in this case, the phase jump between the transmission antennas Tx1 and Tx2 may be exemplarily expressed by Equation 1 below.

$$\Delta \Phi_{Tx1Tx2} = \frac{2\pi}{c} v T_c f = 2\pi f_d T_c \quad \text{[Equation 1]}$$

Here, c is the speed of light, Tc is the chirp time, f is the frequency of the reception signal, and fd is the Doppler frequency.

Figure 5:
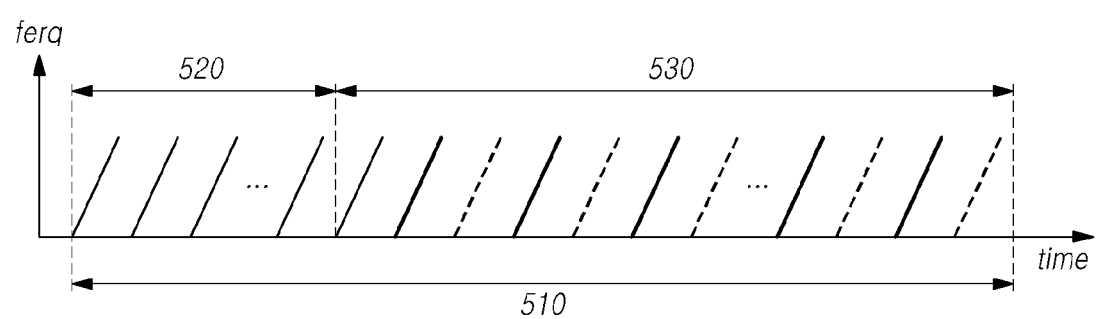
FIG. 5 is a graph for explaining a configuration for performing a first mode and a second mode within one frame according to an embodiment.

FIG. 5 is a graph for explaining a configuration for performing a first mode and a second mode within one frame according to an embodiment.

Referring to FIG. 5, the vehicle radar device according to an embodiment may perform the first mode 520 and the second mode 530 in a time division (multiplexing) manner within one frame 510. That is, when one frame 510 is the total time in the time-frequency graph, the first mode 520 and the second mode 530 may be temporally separated.

In addition, the first mode may use a single-input multi-output (SIMO) scheme using one transmission antenna and multiple receiving antennas, and the second mode may use a multi-input multi-output (MIMO) scheme using two transmission antennas and multiple receiving antennas. Here, in the second mode, signals may be processed in a time division manner between Tx1 and Tx2 as well.

In the graph shown in FIG. 5, a solid line indicates a chirp generated by Tx1, and a dotted line indicates a chirp generated by Tx2. That is, in the SIMO-based first mode, only chirps (solid line) generated by Tx1 exist, and in the MIMO-based second mode, both chirps (solid and dotted lines) generated by Tx1 and Tx2 exist.

Figure 6:
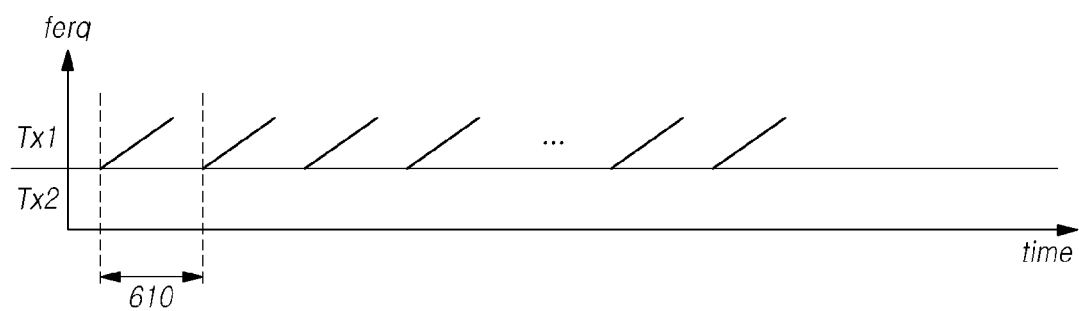
FIG. 6 is a graph for explaining a configuration performed by differently setting pulse repetition intervals in a first mode and a second mode according to an exemplary embodiment.
Figure 6:
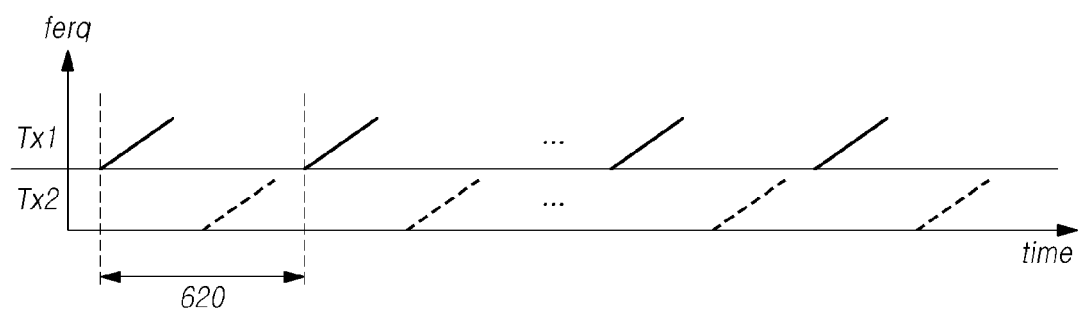

FIG. 6 is a graph for explaining a configuration performed by differently setting pulse repetition intervals in a first mode and a second mode according to an exemplary embodiment.

Referring to FIG. 6, the upper graph is a time-frequency graph for the transmission signal transmitted at the first pulse repetition interval 610 in the first mode, and the lower graph is a time-frequency graph for the transmission signal transmitted at the second pulse repetition interval 620 in the second mode.

In addition, in the graph shown in FIG. 6, a solid line indicates a chirp generated by Tx1, and a dotted line indicates a chirp generated by Tx2. That is, similar as shown in FIG. 5, in the first mode, only chirps (solid line) generated by Tx1 exist, and in the second mode, both chirps (solid and dotted lines) generated by Tx1 and Tx2 exist In addition, the graph shown in FIG. 6 illustrates that the first pulse repetition interval 610 is set to be smaller than the second pulse repetition interval 620. That is, compared with the second mode, the first mode may be set by a smaller pulse repetition interval so that the maximum detection speed is higher.

In this case, even if the speed of the target is greater than the maximum detection speed of the second mode, it is possible to correct the reception signal in the second mode using the target speed detected in the first mode, so that it is possible to improve the accuracy of estimating the direction of the target.

Hereinafter, in FIGS. 7 to 10, it will be described a configuration for detecting a first target and a second target having different speeds, and correcting the phase of a reception signal by determining a phase correction condition for each target.

Figure 7:
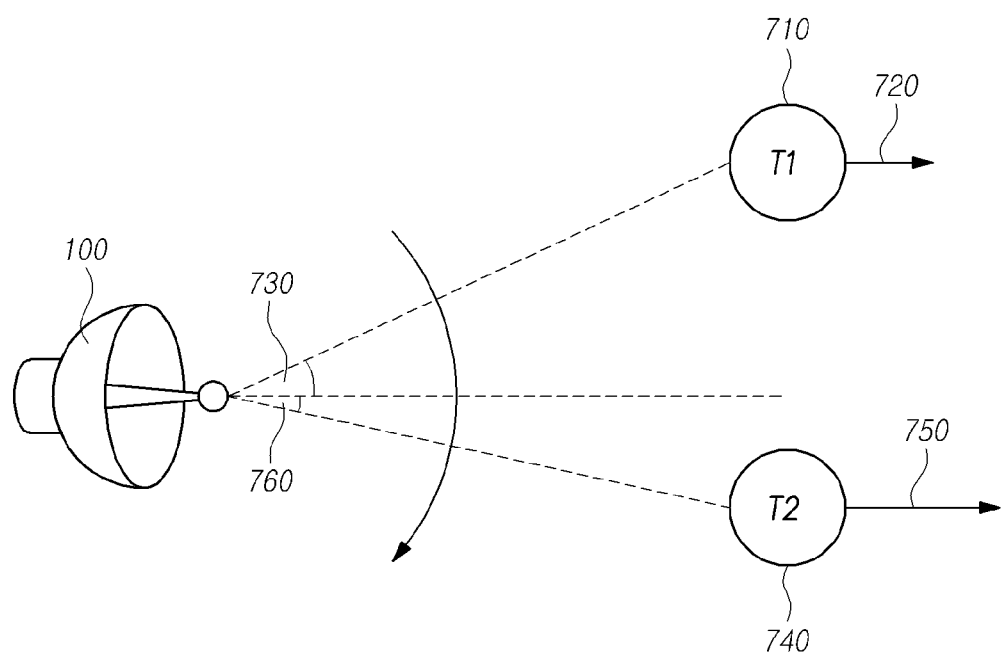
FIG. 7 illustrates an example of a configuration for detecting targets having different speeds using a vehicle radar device according to an embodiment.

FIG. 7 illustrates an example of a configuration for detecting targets having different speeds using a vehicle radar device according to an embodiment.

Referring to FIG. 7, the vehicle radar device 100 according to an embodiment may detect a first target 710 and a second target 740 using a transmitted/received signal, respectively. In this case, the first target 710 may be detected as an object positioned in a first direction 730 with a first speed 720, and the second target 740 may be detected as an object positioned in a second direction 760 with a second speed 750, respectively.

In addition, the first speed 720 may be set to be smaller than the second speed 750 and to have a size smaller than a second mode maximum detection speed vmax_m2, which will be described below with reference to FIGS. 8 to 10. On the other hand, the second speed 750 may be set to be greater than the first speed 720, and to be greater than the second mode maximum detection speed vmax_m2 but smaller than the first mode maximum detection speed vmax_m1, which will be described below with reference to FIGS. 8 to 10.

In addition, the vehicle radar device 100 according to an embodiment may perform the first mode and the second mode, respectively, in the same manner as described with reference to FIGS. 5 and 6. That is, the first mode may use the first transmission antenna Tx1, and may be set to have a relatively short pulse repetition interval and a relatively large maximum detection speed. In addition, the second mode may use the first transmission antenna Tx1 and the second transmission antenna Tx2, and may be set to have a relatively long pulse repetition interval and a relatively small maximum detection speed.

In this case, in the first mode, both the first target 710 and the second target 740 may be detected without error. On the other hand, in the second mode, the first target 710 may be detected without error. However, since the second target 740 is moving at a second speed 750 exceeding the second mode maximum detection speed vmax_m2, so that there may be an error in detecting the second target.

In particular, in the case of utilizing a technology for detecting a target using a phase difference between reception signals in the radar device, there may occur an error between a second target detection direction detected in the second mode and the second direction 760 as the actual direction of the second target.

Accordingly, in the case that the vehicle radar device 100 according to an embodiment detects a target using the first mode and the second mode, it is not required to correct a reception signal for the first target 710 having the first speed 720, however, it is required to correct the detection speed, phase and direction in the second mode reception signal for the second target 740 having the second speed 750.

Figure 8:
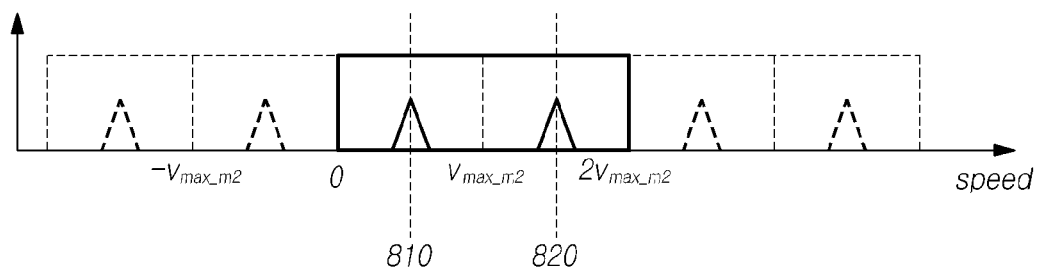
FIG. 8 is a graph for explaining a configuration for detecting targets having different speeds in a second mode according to an embodiment.

FIG. 8 is a graph for explaining a configuration for detecting targets having different speeds in a second mode according to an embodiment.

Referring to FIG. 8, the vehicle radar device 100 according to an embodiment may detect a target using the second mode. In addition, the target detection result may be represented as a speed-target graph as shown in FIG. 8.

For example, in the graph shown in FIG. 8, the targets indicated by the solid or dotted lines respectively have different actual speeds, but due to the limit of the maximum detection speed vmax_m2 of the second mode, all of the targets are represented to be detected as targets having the same speed.

However, a target indicated by a solid line indicates a case in which a target detected in the second mode actually exists, and a target indicated by a dotted line indicates a case in which a target detected in the second mode does not actually exist. These contents may be applied similarly to FIGS. 9 and 10 below.

That is, in FIG. 8, the first target having the first speed 810 and the second target having the second speed 820 are expressed as a case in which both the first target and the second target are detected to have the first speed 810 in the second mode.

That is, the second target is not detected as having the second speed 820 due to the limit of the maximum detection speed vmax_m2 of the second mode, but is detected as having the first speed 810 equal to the speed of the first target.

For example, if the speed of the first target is 6 m/s, the speed of the second target is 16 m/s, the first speed 810 is 6 m/s, the second speed 820 is 16 m/s, and the maximum detection speed in the second mode is 10 m/s, the first target may be detected without error, but a detection error may occur in the second target.

Specifically, in the second mode, the first target and the second target are detected as separate targets, respectively, and the first target is detected as having a first speed 810 equal to the actual speed 6 m/s.

However, since the actual speed of the second target of 16 m/s exceeds the maximum detection speed of 10 m/s in the second mode, a velocity folding phenomenon occurs. Therefore, there may occur an error in which the second target is detected as having the first speed 810, that is, 6 m/s rather than the second speed 820 equal to the actual speed of 16 m/s.

Figure 9:
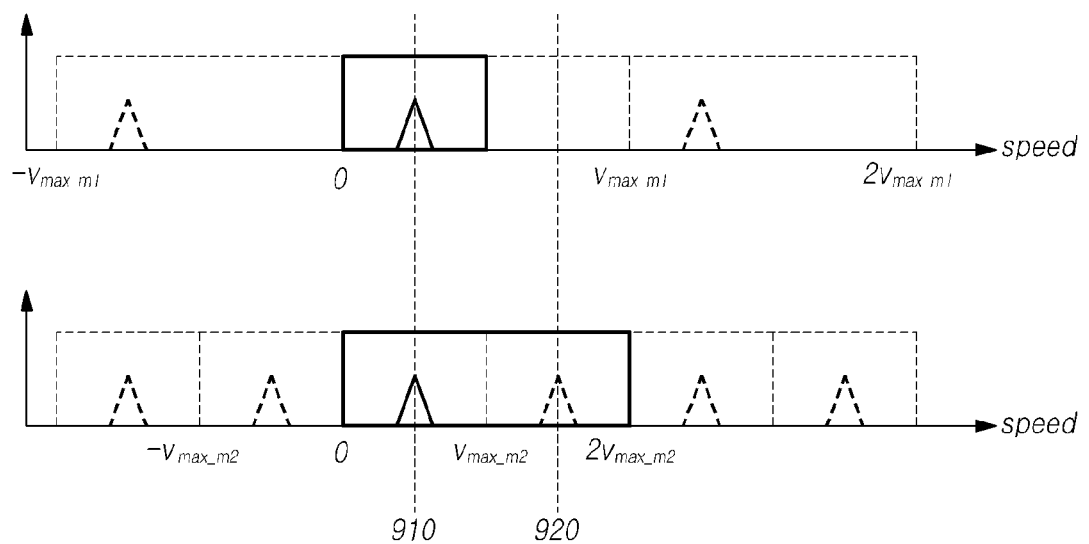
FIG. 9 is a graph for explaining a configuration for performing phase correction in a first mode and a second mode according to an exemplary embodiment.

FIG. 9 is a graph for explaining a configuration for performing phase correction in a first mode and a second mode according to an exemplary embodiment.

Referring to FIG. 9, the vehicle radar device 100 according to an embodiment may detect a target using the first mode and the second mode, respectively. In addition, the target detection result may be expressed as a speed-target graph for each mode. In FIG. 9, the upper graph illustrates the results of detecting the target in the first mode, and the lower graph illustrates the results of detecting the target in the second mode.

In addition, FIG. 9 illustrates a case in which a first target having an actual first speed 910 is detected as having a first speed 910 in both the first mode and the second mode.

For example, in the case that the actual speed of the first target is 6 m/s, the first speed 910 is 6 m/s, the maximum detection speed in the first mode is 20 m/s, and the maximum detection speed in the second mode is 10 m/s, the first target can be detected without error in both the first mode and the second mode.

In addition, there may be determined whether a phase correction condition is satisfied by using the detection result, so that phase correction can be performed according to the determination result. Here, the phase correction condition may include at least one of a phase correction condition based on Doppler frequency information and a phase correction condition based on phase difference information, as described above with respect to the signal processor 120.

As an example, regarding the phase correction condition based on the Doppler frequency, the following equation 2 may be exemplarily applied to a case where it is determined that correction is not required because no error occurs.

$$0 < f_{d\_m1} < f_{d\_m2_{max}}$$ [Equation 2]

Here, fd_m1 is the Doppler frequency measured in the first mode, and fd_m2max is the maximum Doppler frequency of the second mode.

That is, in the case of determining whether or not the set phase correction condition is satisfied based on the Doppler frequency information of the first target included in the first mode reception signal and the second mode reception signal, in the first mode, since the Doppler frequency fd_m1 is determined to be smaller than the maximum Doppler frequency fd_m2max of the first target in the second mode, there may be determined that there is no need to perform phase correction.

As another example, regarding the phase correction condition based on the phase difference, the following equation 3 may be exemplarily applied to a case where it is determined that correction is not required because no error occurs.

$$0 < \Delta\Phi < \pi$$ [Equation 3]

Here, ΔΦ represents phase difference information.

That is, in the case of determining whether a phase correction condition set is satisfied based on the phase difference information of the first target included in the first mode reception signal and the second mode reception signal, in the first mode, since it is determined that the phase difference of the first target does not exceed π, there may be determined that there is no need to perform phase correction.

As described above, in the case that it is determined that phase correction is not necessary, the following Equation 4 may be exemplarily applied to each signal.

$$S_{tx_1}[f_{d\_m2}] = \sum_n s_{tx_1}[n] \cdot \exp(-j2\pi f_{d\_m2} T_c n) \quad \text{[Equation 4]}$$

$$S_{tx_2}[f_{d\_m2}] = \sum_n s_{tx_2}[n] \cdot \exp\left(-j2\pi f_{d\_m2} T_c \left(n - \frac{1}{2}\right)\right)$$

That is, in the case that the second mode reception signal is a signal having a Doppler frequency fd_m2, if it is determined that phase correction is not necessary since neither the phase correction condition based on the Doppler frequency information nor the phase correction condition based on the phase difference information of the first mode reception signal are satisfied, as in Equation 4 above, the phase correction is not performed on the second mode reception signal.

Figure 10:
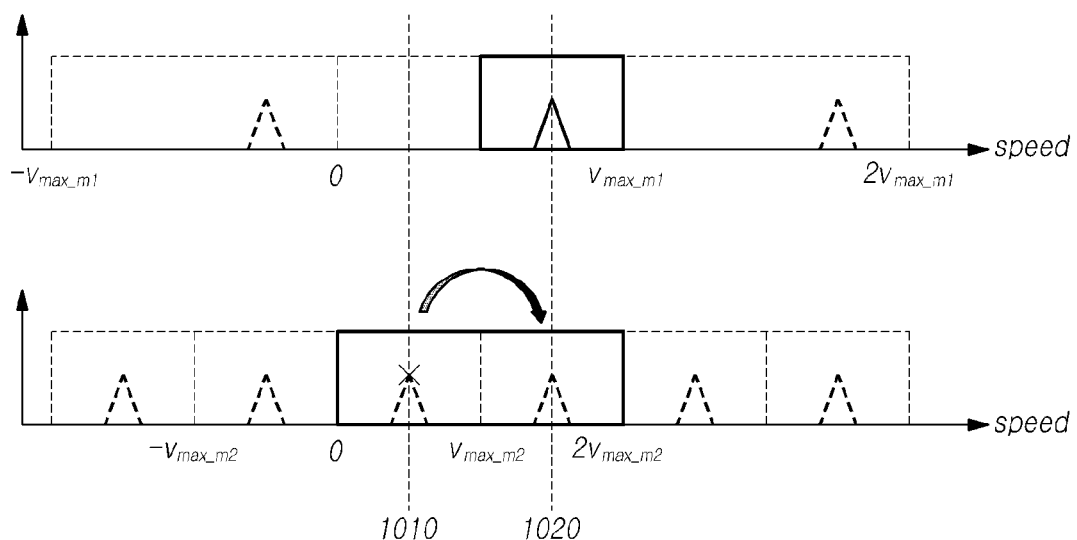
FIG. 10 is a graph for explaining a configuration for performing phase correction in a first mode and a second mode according to another embodiment.

FIG. 10 is a graph for explaining a configuration for performing phase correction in a first mode and a second mode according to another embodiment.

Referring to FIG. 10, the vehicle radar device 100 according to another embodiment may detect a target by using the first mode and the second mode, respectively. In FIG. 10, the upper graph illustrates the results of detecting the target in the first mode, and the lower graph illustrates the results of detecting the target in the second mode.

In addition, FIG. 10 illustrates a case in which a second target having an actual second speed 1020 is detected as having a second speed 1020 in the first mode, and is detected as having a first speed 1010 in the second mode.

For example, in the case that the actual speed of the second target is 16 m/s, the first speed 1010 is 6 m/s, the second speed 1020 is 16 m/s, and the maximum detection speed in the first mode is 20 m/s, and the maximum detection speed in the second mode is 10 m/s, the second target is detected without error in the first mode, but a detection error may occur with respect to the second target in the second mode.

In addition, there may be determined whether a phase correction condition is satisfied by using the detection result, so that phase correction can be performed according to the determination result.

For example, regarding the phase correction condition based on the Doppler frequency, the following equation 5 may be exemplarily applied to a case in which it is determined that correction is necessary.

$$f_{d\_m2max} < f_{d\_m1} < 2 f_{d\_m2max} \quad \text{[Equation 5]}$$

That is, in the case of determining whether the phase correction condition set is satisfied based on the Doppler frequency information of the first target included in the first mode reception signal and the second mode reception signal, since the Doppler frequency fd_m1 of the first target in the first mode is determined to exceed the maximum Doppler frequency fd_m2max of the first target in the second mode, there may be determined that the phase correction is necessary.

As another example, regarding the phase correction condition based on the phase difference, the following equation 6 may be exemplarily applied to a case in which it is determined that correction is necessary.

$$\pi < \Delta\Phi < 2\pi \quad \text{[Equation 6]}$$

That is, in the case of determining whether a phase correction condition set is satisfied based on the phase difference information of the first target included in the first mode reception signal and the second mode reception signal, since it is determined that the phase difference of the first target in the first mode does exceed π, there may be determined that the phase correction is necessary As described above, in the case that it is determined that phase correction is necessary, the following Equation 7 may be exemplarily applied to each signal.

$$S_{tx_1}[f_{d\_m2} + f_{d\_m2max}] = \sum_n s_{tx_1}[n] \cdot \exp(-j2\pi f_{d\_m2} n T_c) \quad \text{[Equation 7]}$$

$$S_{tx_2}[f_{d\_m2} + f_{d\_m2max}] = \sum_n s_{tx_2}[n] \cdot \exp\left(-j2\pi f_{d\_m2} T_c \left(n - \frac{1}{2}\right)\right) \cdot \exp(j\pi)$$

That is, the Doppler frequency should actually be calculated as fd_m2+fd_2max from the second mode reception signal, but may be calculated as fd_m2. In this case, if it is determined that phase correction is required by satisfying at least one of a phase correction condition based on Doppler frequency information or a phase correction condition based on phase difference information of the first mode reception signal, the phase correction may be performed for the second mode reception signal as shown in Equation 7.

Specifically, the phase of the reception signal may be corrected by adding the exp(jπ) part in Equation 7 above. As an example, Equation 7 expresses that the phase of the reception signal is corrected by adding exp(jπ) to the reception signal by the second transmission antenna Tx2.

However, as another example, the second mode reception signal may be corrected by correcting both the reception signal by the first transmission antenna Tx1 and the reception signal by the second transmission antenna Tx2. In this case, the phase of the reception signal may be corrected by adding exp(jπ) not only to a reception signal corresponding to Stx2[fd_m2+fd_m2max] but also to the reception signal corresponding to Stx1[fd_m2+fd_m2max].

Figure 11:
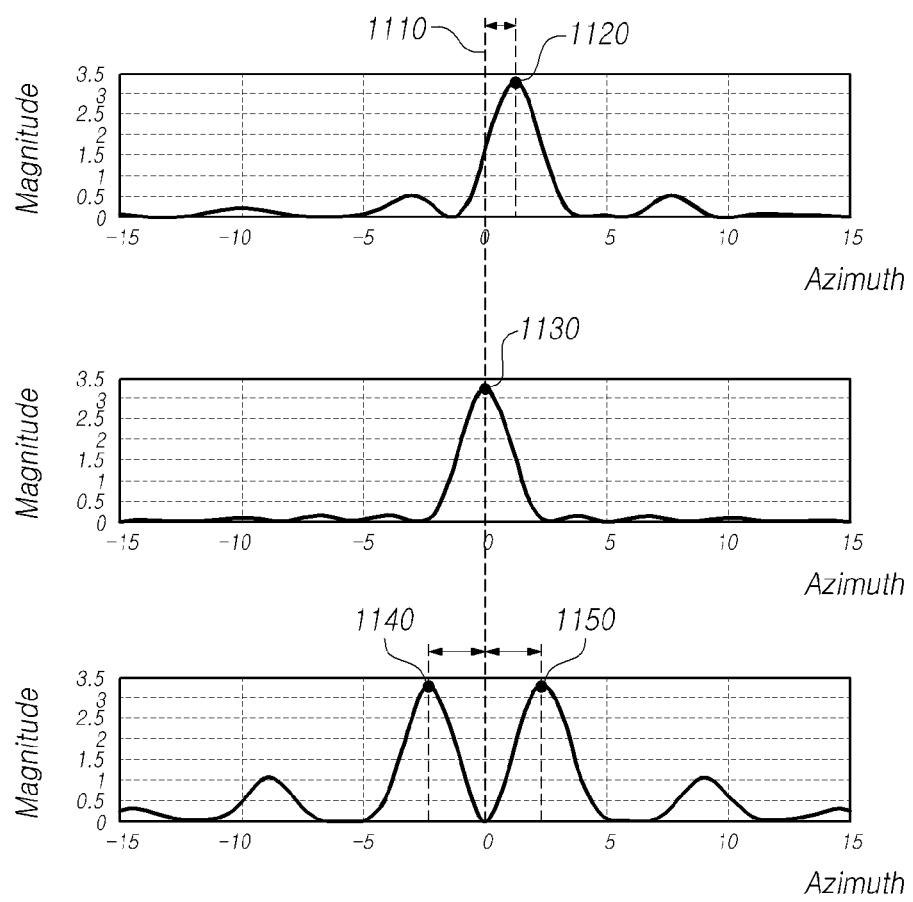
FIG. 11 is a graph for explaining a state before and after phase correction according to an exemplary embodiment.

FIG. 11 is a graph for explaining a state before and after phase correction according to an exemplary embodiment.

Referring to FIG. 11, in the case of detecting a target having an actual direction of 0°, a case before phase correction (upper graph), a case after correct correction (middle graph), and a case after incorrect correction (lower graph) are shown as azimuth-(signal)magnitude graphs, respectively. Here, in all three graphs, a portion having an azimuth angle of 0° is indicated as having a common center line 1110.

The upper graph in FIG. 11 illustrates as a case in which a target located in an actual direction of 0° is incorrectly detected as an azimuth corresponding to the peak 1120 before correction of the reception signal. There may be several causes of such a detection error. Specifically, a case in which at least one of the speed, Doppler frequency, and phase of the target is erroneously detected may also be a cause of the above detection error.

In this case, there is required to solve the detection error of the reception signal by performing the phase correction on the reception signal according to the present disclosure.

The middle graph in FIG. 11 illustrates the reception signal after correctly performing the phase correction according to the present disclosure. That is, through the correct phase correction, there may correct the case in which at least one of the speed, Doppler frequency, and phase of the target is erroneously detected in the reception signal.

In this case, the reception signal is detected as an azimuth angle corresponding to the peak 1130 after correction, which coincides with the actual direction 0° of the target, thereby solving the measurement error of the target direction.

The lower graph in FIG. 11 illustrates the reception signal after erroneous correction is performed, unlike the phase correction according to the present disclosure. For example, in the case of performing the phase correction by adding $+\pi$ to a portion in which at least one of the speed, Doppler frequency, and phase of the target is erroneously detected in the reception signal, if the phase correction by adding $-\pi$ or $+2\pi$ is performed, or when the reception signal is corrected in another incorrect manner, the result shown in the lower graph of FIG. 11 may appear.

In this case, the reception signal may cause an error in which two azimuth angles corresponding to the first peak 1140 and the second peak 1150 after correction, that is, two targets, are detected for one target whose actual direction is 0°, and an error in which each of the azimuth angles corresponding to the first peak 1140 after correction and the second peak 1150 after correction is detected to be different from the actual direction 0° of the target.

That is, in the case an error in estimating the direction of a target occurs, the error may be resolved if the reception signal is correctly corrected. However, if incorrect or erroneous correction is performed, an error in estimating a direction of a target may increase, or an error in erroneous estimation of the number of detected targets may additionally occur.

The vehicle radar device 100 may be implemented to including an electronic control unit (ECU), a microcomputer, or the like.

In an embodiment, a computer system (not shown) such as the vehicle radar device 100 may be implemented as an electronic control unit (ECU). The electronic control unit may include at least one or more elements of one or more processors, memories, storage unit, user interface input unit and user interface output unit, which may communicate with each other via a bus. Further, the computer system may also include a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the vehicle radar device 100 according to the present embodiment and the signal processor 120 and the controller 130 included therein may be implemented as a module of a control device or an ECU of a radar system mounted on a vehicle.

The control device or ECU of such a radar system may include a processor, a storage device such as a memory, and a computer program capable of performing a specific function. In addition, the signal processor 120 and the controller 130 may be implemented as software modules capable of performing respective corresponding functions.

That is, the signal processor 120 and the controller 130 according to the present embodiment may be implemented as respective software modules and stored in a memory, and each software module may be executed at a specific time point in an arithmetic processing unit such as an ECU included in the vehicle radar system.

Hereinafter, the vehicle radar device 100 will be briefly described once again in terms of a control method. The duplicate contents of the above-described description are omitted if necessary, but all may be applied to the following description of the method.

Figure 12:
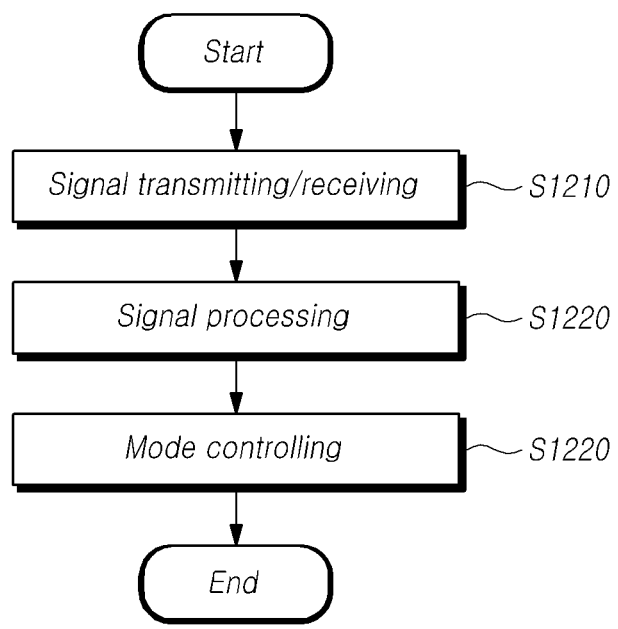
FIG. 12 is a flowchart illustrating a method for controlling a radar device for a vehicle according to the present disclosure.

FIG. 12 is a flowchart illustrating a method for controlling a radar device for a vehicle according to the present disclosure.

Referring to FIG. 12, a controlling method of a vehicle radar device according to the present disclosure may include a signal transmission/reception step S1210 of transmitting a transmission signal using a transmission antenna and receiving a reception signal reflected from a target using a receiving antenna, a signal processing step S1220 of determining target direction information by using a phase difference between the reception signals received from each receiving antenna, and a mode control step S1230 of controlling to perform the first mode and the second mode for transmitting and receiving signals at different pulse repetition intervals, respectively.

In the signal transmission/reception step S1210, there may use at least two or more transmission antennas and receiving antennas, respectively. In addition, in some cases, all antennas may be used or only some antennas may be used. Specifically, in the signal transmission/reception step S1210, in relation to the configuration of the transmission antenna and the receiving antenna, there may be used at least one of MIMO, SIMO, MISO, and SISO technologies.

In the signal transmission/reception step S1210, the transmission signal and the reception signal may be implemented to use a transmission channel and a receiving channel, respectively, may be implemented to use a synthesized channel. Here, the synthesis channel may be implemented to express changes in the magnitude and phase of a transmission signal and a reception signal as a reflection signal thereof, and the transmission signal and the reception signal may also be synthesized and processed.

For example, in a configuration including two transmission antennas of a first transmission antenna Tx1 and a second transmission antenna Tx2, and four receiving antennas of a first receiving antenna Rx1, a second receiving antenna Rx2, a third receiving antenna Rx3 and a fourth receiving antenna Rx4, if a signal is transmitted from Tx1 and a reflected signal is received from Rx4, the signal may be processed in a synthesized channel of Tx1-Rx4.

Meanwhile, the signal transmitted and received in this signal transmission/reception step S1210 may be controlled in the mode control step S1230. In this case, the signal transmission/reception control may be performed based on preset setting values required for signal transmission/reception, such as the number of each used transmission antenna and receiving antenna, and a pulse repetition interval.

The signal processing step S1220 may include determining phase information about the phase of each signal, target direction information about the direction in which the target is located from the radar, and the like, based on the signals transmitted and received by each antenna. In addition, signals transmitted and received in different modes may be individually processed or may be processed together.

For example, in the signal processing step S1220, if signals are transmitted and received in the first mode and the second mode, respectively, the phase difference information and target direction information may be determined by using only the first mode reception signal or only the second mode reception signal. Alternatively, phase difference information and target direction information may be determined by using information of both the first mode reception signal and the second mode reception signal.

In addition, in the signal processing step S1220, phase difference information between reception signals received from each receiving antenna may be determined, and target direction information may be determined using the phase difference information.

The phase difference information may be determined by comparing the phase information of each reception signal, or may be calculated using information included in two or more reception signals received from at least two receiving antennas. In addition, the target direction information may be determined based on the angle of arrival information of the reflection signal by the target of the transmission signal.

Meanwhile, in the signal processing step S1220, if it is determined that the preset phase correction condition is satisfied, the phase of the reception signal may be corrected. The phase correction condition may be set as at least one or more conditions, and if one of phase correction conditions is satisfied, the phase correction may be performed.

As an example, the phase correction condition may be set based on phase difference information, or may be set based on Doppler frequency information and maximum Doppler frequency information of a reception signal.

As described above, since the target direction information may be determined based on the phase difference information between the reception signals, the target direction information may be corrected by correcting the phase of the reception signal. That is, the estimation accuracy of target direction may be improved through phase correction.

In the mode control step S1230, it is possible to control the transmission and reception of a signal based on a preset control setting value. Here, the control setting value may include at least one of a transmission/receiving antenna specification, a transmission time, a frequency, a radiation direction, and an intensity of a signal. Here, the transmission time of the signal may be set to a pulse repetition interval.

The mode control step S1230 may include controlling signal transmission/reception based on different control setting values for each mode by differently setting control setting values for at least two or more modes. In addition, according to the control setting value for each mode, it is possible to control to vary a part or all of the detection performance.

For example, there may be controlled by setting the control setting value in order to transmit a signal at a first pulse repetition interval using a first transmission antenna in the first mode, and to transmit a signal at a second pulse repetition interval using the first transmission antenna and a second transmission antenna in the second mode.

For example, in the mode control step S1230, the control setting values of the first mode and the second mode may be set so that the first pulse repetition interval is smaller than the second pulse repetition interval. In this case, the maximum detection speed of the first mode is greater than the maximum detection speed of the second mode, and the maximum detection range of the first mode becomes smaller than the maximum detection range of the second mode, so that the target detection performance of each mode may vary.

Meanwhile, in the mode control step S1230, there may control the first mode and the second mode to be performed in units of time or frames, and may control the first mode and the second mode by presetting execution times, execution orders, and the like.

For example, in the mode control step S1230, there may control the first mode and the second mode to be performed within one frame. That is, in the case of performing one scanning on the radar, it is possible to control the first mode and the second mode to be performed in the scanning range.

As described above, if the first mode and the second mode are controlled to be performed within one frame range, they do not become larger than a certain size at the measurement time point. Therefore, in comparing and correcting the measurement results of each mode regarding the position and speed of the target with the measurement results of other modes according to the present disclosure, it is possible to improve the accuracy of target measurement.

In this case, the first mode and the second mode may be set to be performed simultaneously, or may be set to be performed separately from each other. Here, if the first mode and the second mode are performed separately from each other, there may utilize a time division multiplexing (TDM) scheme in which signals are transmitted and received at different times.

In addition, if the first mode and the second mode are controlled by the time division multiplexing method, there may be set such that the first mode is performed first and then the second mode is performed.

For example, if the pulse repetition interval of the first mode is set to be small, even if the target speed exceeds the maximum detection speed of the second mode, it is possible to correct the second mode reception signal using the result of the first mode performed first, thereby improving the accuracy in terms of speed and angle of target measurement.

As another example, if the pulse repetition interval of the first mode is set to be large, even if the target distance exceeds the maximum detection range of the second mode, it is possible to correct the second mode reception signal using the result of the first mode performed first, thereby improving the accuracy in terms of speed and angle of target measurement.

In addition, in the mode control step S1230, there may control that both the first mode and the second mode are performed within one frame, and in this case, may control so that the first mode is performed first and then the second mode is performed. In addition, if the phase correction of the reception signal is performed by the signal processor 120, the signal transmission/reception and control of each mode may be performed by reflecting the correction contents thereafter.

Figure 13:
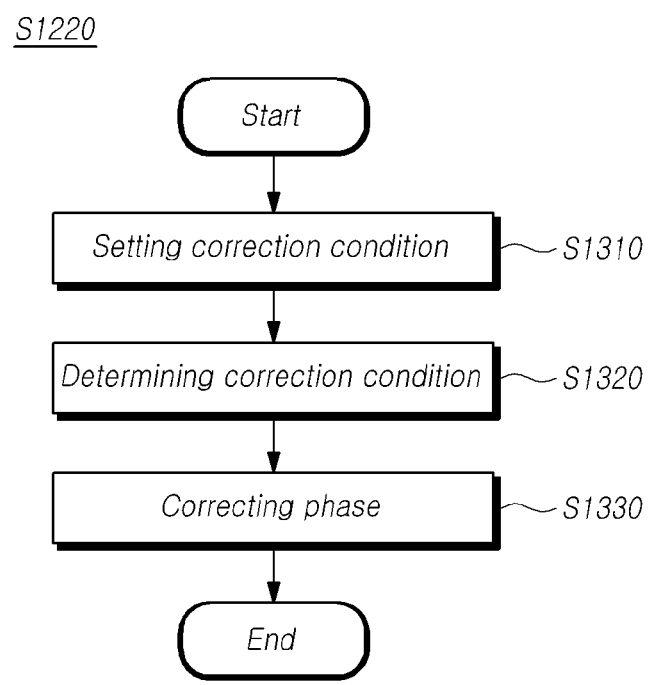
FIG. 13 is a flowchart of a signal processing step according to an embodiment.

FIG. 13 is a flowchart of a signal processing step according to an embodiment.

Referring to FIG. 13, the signal processing step S1220 according to an embodiment may include a correction condition setting step S1310, a correction condition determination step S1320, and a phase correction step S1330.

In the correction condition setting step S1310, at least one phase correction condition with respect to the reception signal may be set.

As an example, the phase correction condition may be set based on the phase difference information of the reception signal. As a specific example, the phase correction condition may be a condition in which it is determined that the phase difference information between the reception signal received by reflection of the transmission signal of the first transmission antenna and the reception signal received by reflection of the transmission signal of the second transmission antenna is $\pi$ or more. In addition, if this phase correction condition is satisfied, phase correction may be performed.

As another example, the phase correction condition may be set based on Doppler frequency information and maximum Doppler frequency information of a reception signal. As a specific example, the phase correction condition may be set to perform the phase correction if the Doppler frequency information of the first mode reception signal exceeds the maximum Doppler frequency information of the second mode reception signal.

In the correction condition determination step S1320, there may be determined whether the reception signal satisfies the phase correction condition set in the correction condition setting step S1310.

In this case, if all of the at least one or more phase correction conditions are not satisfied, the phase correction may not be performed.

On the other hand, if one or more of the preset phase correction conditions are satisfied, the phase correction may be performed.

In addition, in the correction condition determination step S1320, the determination of whether the phase correction condition is satisfied may be performed by comparing the setting value and the measured value of each mode in a state in which two or more modes having different control setting values are performed.

For example, in the case that the first mode transmits a signal at a first pulse repetition interval and the second mode transmits a signal at a second pulse repetition interval, the maximum detection speed and maximum detection range may be different according to the difference in pulse repetition interval in each mode.

That is, if the first pulse repetition interval is smaller than the second pulse repetition interval, the maximum detection speed of the first mode may be smaller than the maximum detection speed of the second mode, and the maximum detection range of the first mode may be greater than the maximum detection range of the second mode. In addition, it is possible to perform correction of the reception by using this characteristic.

In the phase correction step S1330, if one or more of each phase correction condition is satisfied, there may correct the phase of the reception signal by adding $\pi$ to the phase of the reception signal. In this case, the phase correction may be performed for all or part of the measured reception signal.

For example, if a reflected signal of a signal transmitted by the first transmission antenna is received in the first mode, and a reflected signal of a signal transmitted by the first transmission antenna and the second transmission antenna is received in the second mode, phase correction may be performed only for a reception signal obtained by receiving a reflected signal of a signal transmitted by the second transmitting antenna in the second mode.

As another example, if the target speed is smaller than the maximum detection speed of the first mode but exceeds the maximum detection speed of the second mode, there may be occurred a target measurement error in the second mode.

In this case, the detection signal of the second mode may be corrected using the detection signal of the first mode. That is, the second mode reception signal may be corrected by using at least one of speed information, distance information, Doppler frequency information, and phase difference information of the target in the first mode reception signal.

As another example, if the target distance is smaller than the maximum detection range of the second mode but exceeds the maximum detection range of the first mode, a target measurement error may occur in the first mode.

In this case, the detection signal of the first mode may be corrected using the detection signal of the second mode. That is, the first mode reception signal may be corrected by using at least one of speed information, distance information, Doppler frequency information, and phase difference information of the target in the second mode reception signal.

As described above, according to a vehicle radar device and a controlling method thereof of the present disclosure, it is possible to improve the accuracy of direction measurement and speed measurement of the target by using two or more modes having different modulation schemes.

In addition, it is possible to solve the occurrence of errors in measuring the direction and speed of the target by correcting the phase measurement error using the reception signal of each mode.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure.

What is claimed is:

1. A radar device for a vehicle comprising:
   an antenna unit including a transmission antenna for transmitting a transmission signal and a receiving antenna for receiving a reception signal reflected from a target;
   a signal processor configured to determine target direction information by using a phase difference between the reception signals received from the respective receiving antennas; and
   a controller configured to control to perform a first mode and a second mode for transmitting and receiving signals at different pulse repetition intervals, respectively,
   wherein the signal processor is configured to, if a preset phase correction condition is satisfied, correct a second mode reception signal received in the second mode based on a first mode reception signal received in the first mode, and
   wherein the signal processor determines phase difference information included in only the first mode reception signal or only the second mode reception signal for each target based on phase information included in each reception signal.

2. The radar device of claim 1, wherein the antenna unit comprises a first transmission antenna and a second transmission antenna,
   wherein the transmission signal is transmitted using the first transmission antenna in the first mode, and the transmission signal is transmitted using the first transmission antenna and the second transmission antenna in the second mode.

3. The radar device of claim 2, wherein the phase correction condition is a condition set to perform phase correction if the phase difference information exceeds $\pi$.

4. The radar device of claim 1, wherein the signal processor determines Doppler frequency information and maximum Doppler frequency information for each target based on frequency information and target speed information included in each of the reception signals, and
   wherein the phase correction condition is a condition set to perform phase correction if the Doppler frequency information of the first mode reception signal exceeds the maximum Doppler frequency information of the second mode reception signal.

5. The radar device of claim 1, wherein, if the phase correction condition is satisfied, the signal processor corrects the second mode reception signal by adding a phase by $\pi$ to a phase of the second mode reception signal.

6. The radar device of claim 1, wherein the controller controls to perform the first mode and the second mode such that a pulse repetition interval of the first mode is set to a value smaller than a pulse repetition interval of the second mode.

7. The radar device of claim 1, wherein the controller controls to perform the first mode and the second mode within one frame.

8. The radar device of claim 7, wherein the controller controls to perform the second mode after performing the first mode.

9. A controlling method of a vehicle radar device comprising:
controlling to perform a first mode and a second mode for transmitting and receiving signals at different pulse repetition intervals, respectively;
transmitting transmission signals using transmission antennas and receiving a first mode reception signal at the first mode and a second mode reception signal at the second mode reflected from a target using receiving antennas;
determining phase difference information by using phase information included in only the first mode reception signal or only the second mode reception signal;
determining target direction information by using the phase difference information; and
correcting the target direction information by correcting, based on a preset phase correction condition, the phase information included in the second mode reception signal based on the first mode reception signal.

10. The controlling method of claim 9, wherein transmitting transmission signals comprises transmitting the transmission signals using a first transmission antenna and a second transmission antenna,
wherein the transmission signals are transmitted using the first transmission antenna in the first mode, and the transmission signals are transmitted using the first transmission antenna and the second transmission antenna in the second mode.

11. The controlling method of claim 10, wherein the phase correction condition is a condition set to perform phase correction if the phase difference information exceeds $\pi$.

12. The controlling method of claim 9, further comprising:
determining Doppler frequency information and maximum Doppler frequency information for the target based on frequency information and target speed information included in each of the reception signals, and
wherein the phase correction condition is a condition set to perform phase correction if the Doppler frequency information of the first mode reception signal exceeds the maximum Doppler frequency information of the second mode reception signal.

13. The controlling method of claim 9, wherein correcting the target direction information comprises, if the phase correction condition is satisfied, correcting the second mode reception signal by adding a phase by $\pi$ to the phase information included in the second mode reception signal.

14. The controlling method of claim 9, wherein the controlling comprises controlling to perform the first mode and the second mode such that a pulse repetition interval of the first mode is set to a value smaller than a pulse repetition interval of the second mode.

15. The controlling method of claim 9, wherein the controlling comprises controlling to perform the first mode and the second mode within one frame.

* * * * *